United States Patent [19]

Pepoy

[11] 4,452,740

[45] Jun. 5, 1984

[54] PREPARATION OF CHLORINATED PHTHALOCYANINES

[75] Inventor: Louis J. Pepoy, Holland, Mich.

[73] Assignee: BASF Wyandotte Corporation, Wyandotte, Mich.

[21] Appl. No.: 401,088

[22] Filed: Jul. 23, 1982

[51] Int. Cl.$^3$ ............................................. C09B 47/10
[52] U.S. Cl. .......................... 260/245.83; 260/245.82; 260/245.84
[58] Field of Search ...................... 260/245.82, 245.83, 260/245.84

[56] References Cited

U.S. PATENT DOCUMENTS

| | | | |
|---|---|---|---|
| 2,214,469 | 9/1940 | Linstead et al. | 260/245.84 X |
| 2,662,085 | 12/1953 | Holtzman et al. | 260/245.83 |
| 2,793,214 | 5/1957 | Holtzman et al. | 260/245.84 X |
| 2,862,929 | 12/1958 | Caliezi et al. | 260/245.84 |
| 2,873,279 | 2/1959 | Randall et al. | 260/245.84 X |
| 3,320,276 | 5/1967 | Hamilton et al. | 260/245.83 |
| 3,424,759 | 1/1969 | Stewart et al. | 260/245.84 |
| 4,035,383 | 7/1977 | Sweet | 260/245.84 |
| 4,077,974 | 3/1978 | Wessling | 260/245.84 X |
| 4,091,028 | 5/1978 | Barraclough et al. | 260/245.83 |

OTHER PUBLICATIONS

Moser et al., Phthalocyanine Compounds, ACS, (1963), pp. 172-179.

*Primary Examiner*—Richard Raymond
*Attorney, Agent, or Firm*—Bernhard R. Swick

[57] ABSTRACT

According to the present invention there is provided a process for the production of highly halogenated copper phthalocyanine which comprises heating at an elevated temperature a mixture of copper phthalocyanine, sulfuryl chloride, sulfur monochloride, aluminum chloride and cuprous chloride thereby obtaining a green copper phthalocyanine.

3 Claims, No Drawings

PREPARATION OF CHLORINATED PHTHALOCYANINES

BACKGROUND OF THE INVENTION

1. Field of the Invention

This invention relates to the chlorination of copper phthalocyanine to produce a green shade of copper phthalocyanine.

2. Description of the Prior Art

It is well known that the shade of copper phthalocyanine varies according to the number of chlorine atoms present in the molecule. Thus the blue shade of the unchorinated copper phthalocyanine changes to green-blue when 8 chlorine atoms are introduced and to a more intense green shade when 12 or more chlorine atoms are incorporated into the copper phthalocyanine molecule.

In the past, processes for the preparation of phthalocyanine green employed large amounts of expensive reagents as solvents such as chlorosulfonic acid which are then discarded after the reaction is complete. Such processes are expensive due both to the waste of the discarded solvent and to long reaction times required to make the phthalocyanine green.

Chlorinated metal phthalocyanines have been produced by a variety of methods. As halogenating agents, it has been proposed to employ normally liquid halogenating agents such as sulfuryl chloride and thionyl chloride. Such halogen carriers as aluminum chloride are used in limited quantities, but the bulk of the reaction medium consists of the liquid halogenating agent. In other words, the halogenating agent is dependent upon to supply the liquid medium for the reaction.

U.S. Pat. No. 3,320,276 teaches that sulfuryl chloride will halogenate a metal-free phthalocyanine or a metal complex of phthalocyanine such as copper phthalocyanine without the addition of elemental halogen in the presence of aluminum chloride and/or aluminum bromide and, preferably, containing an alkali metal halide such as sodium chloride with sulfur monochloride present as a halogen carrier. However, this process requires the aluminum chloride or aluminum bromide be in the form of a fluid melt. This has many disadvantages since it requires means for heating and maintaining the aluminum chloride in a fluid state. Large quantities of the aluminum chloride are required in this process, for example, all the examples call for 100 parts of anhydrous aluminum chloride for 10 parts of copper phthalocyanine. Further, the hydrolyzed aluminum chloride (at the end of the reaction) is discarded and may contribute to effluent problems.

Moser and Thomas, *Phthalocyanine Compounds*, pages 172-179, Reinhold Publishing Corporation, New York (1963), discloses the use of copper chloride as a catalyst for chlorinating copper phthalocyanine. However, it does not disclose the use of copper chloride in a process involving the reaction of the copper phthalocyanine with sulfuryl chloride.

| Other References of Interest | | |
|---|---|---|
| Pat. No. | Issued | Inventor(s) |
| 2,214,469 | 9/10/40 | Patrick et al |
| 3,424,759 | 1/28/69 | Stewart et al |
| 4,077,974 | 3/7/78 | Wessling |
| 4,091,028 | 5/23/78 | Barraclough et al |
| 4,035,383 | 7/12/77 | Sweet |

| -continued | | |
|---|---|---|
| Other References of Interest | | |
| Pat. No. | Issued | Inventor(s) |
| 2,873,279 | 2/10/59 | Randall et al |
| 2,793,214 | 5/21/57 | Holtzman et al |
| 2,662,085 | 12/8/53 | Holtzman et al |
| 2,862,924 | 12/2/58 | Caliezi et al |

SUMMARY OF INVENTION

It is a purpose of the instant invention to provide a process for halogenating copper phthalocyanine using a solvent wherein problems of loss due to excessive waste of solvent and to the need for a fluid melt of an aluminum chloride or similar catalyst are eliminated or substantially reduced. More specifically, this invention relates to a process for the halogenation of copper phthalocyanine comprising reacting a mixture of copper phthalocyanine, sulfuryl chloride, sulfur monochloride, aluminum chloride and cuprous chloride to produce a green shade copper phthalocyanine compound.

DESCRIPTION OF THE PREFERRED EMBODIMENT

According to the present invention there is provided a process for the production of highly halogenated copper phthalocyanine which comprises heating at an elevated temperature a mixture of copper phthalocyanine, sulfuryl chloride, sulfur monochloride, aluminum chloride and cuprous chloride thereby obtaining a green copper phthalocyanine.

The quantities of sulfuryl chloriide and of sulfur monochloride used as well as the amounts of the cuprous chloride and aluminum chloride catalyst are important for a satisfactory performance of the process according to the invention. The minimum amounts are limited by the amount of catalyst necessary to permit the reaction to run to completion in a reasonable amount of time (e.g., one day). The maximum amounts are limited by cost considerations, i.e., excessive amounts are wasteful. More specifically, it is preferred that the mixture prior to the reaction contain by weight about 2 to 2000 parts sulfuryl chloride, about 0.05 to 50 parts sulfur monochloride, about 0.025 to 25 parts aluminum chloride, and about 0.025 to 25 parts cuprous chloride per part of phthalocyanine blue. The preferred proportions are by weight, about 2 to 100 parts sulfuryl chloride, about 0.1 to 5.0 parts sulfur monochloride, about 0.1 to 5.0 parts aluminum chloride, and about 0.1 to 5.0 parts cuprous chloride per part of phthalocyanine blue.

The most preferred proportions are by weight about 2.0 to 20 parts sulfuryl chloride, about 0.1 to 5.0 parts sulfur monochloride, about 0.1 to 5.0 parts aluminum chloride, and about 0.1 to 1.0 parts cuprous chloride per part of phthalocyanine blue. In commercial practice the unreacted sulfuryl chloride can be distilled over and recovered for reuse. This provides an economic advantage over prior art processes employing chlorosulfonic acid as a solvent which is then discarded after the reaction is complete.

It is possible to vary the temperature at which halogenation may be effected within relatively wide limits without departing from the scope of the invention. However, a preferred working range of temperature is from about 75° to 200° C. and most preferably 90° to 100° C. The preferred pressure for carrying out the present invention, generally ranges from atmospheric to 100 bars, preferably from about 5 to 15 bars, and the time required ranges from about 0.5 to 24 hours and most preferably about 1 to 5 hours at the maximum pressure. In general, after the reaction the sulfuryl chloride is removed by evaporation. The residue is then slurried in by weight, from about 10 to 100 parts of water and about 1 to 20 parts by weight sodium bicarbonate per part of copper phthalocyanine.

By means of the instant invention, it is possible to provide a high degree of chlorination of the copper phthalocyanine whereby a good green color is achieved.

The invention will be illustrated by the following examples in which all parts and percentages are by weight and all temperatures are in degrees centigrade unless expressly stated otherwise.

EXAMPLE 1

To a 250 ml by volumne Berghof Teflon-lined autoclave was added 5 grams of sulfur monochloride, 2.5 grams of aluminum chloride, 100 ml of sulfuryl chloride, 2.5 grams of cuprous chloride and 10 grams of acid purified phthalocyanine blue crude. The reactor was sealed and heating started. After about 15 minutes, the pressure was 320 psig and the temperature was 125° C. Over the next 15 to 20 minutes the reaction reached a maximum temperature of 170° C. and a pressure of 900 psig.

The reactor was then cooled to room temperature, opened, and the sulfuryl chloride removed by evaporation. The residue was slurried in 500 ml of water and sodium bicarbonate was added until gas (carbon dioxide) evolution ceased. The slurry was acidified with sulfuric acid, filtered, washed and dried. The yield of green pigment was 17 grams with a chlorine content of 43.8 percent (which corresponds to about 12.2 to 12.5 chlorine atoms per molecule). This is about 98 percent of theoretical yield. The pigment was rubbed up in a vehicle to give a blue shade green that appeared to be about equal in strength to a pigment prepared by salt grinding a phthalocyanine green crude.

EXAMPLE 2

To a 300 ml, three-neck, round bottom flask equipped with stirrer, reflux condenser with a drying tube and a thermometer was added 5 grams of sulfur monochloride, 2.5 grams anhydrous aluminum chloride and 100 ml of sulfuryl chloride. This was mixed and 10 grams of phthalocyanine blue was added. After the blue was added, the temperature was slowly raised to reflux (about 69° C.) over a 2 hour period. Only enough heat was employed to maintain a gentle reflux. Any decrease in the volume of material in the flask during reflux was made up with additional sulfuryl chloride and the refluxing continued. The sulfuryl chloride was then stripped under reduced pressure at room temperature using an iced receiving flask. The residue was digested in 500 ml of water and solid sodium bicarbonate added until there was no more $CO_2$ given off. The mixture was then heated to 100° C. for 1 hour, slowly acidified to a pH of 0.5 to 1 with sulfulric acid, filtered and washed until the pH was 6 to 7. Phthalocyanine green was not obtained.

EXAMPLE 3

Example 2 was repeated except the refluxing step was carried out for 8 hours rather than for 2 hours. As with Example 2, phthalocyanine green was not obtained.

The embodiments of the invention in which an exclusive property or privilege is claimed are defined as follows:

1. A process for the halogenation of copper phthalocyanine comprising reacting at a temperature of about 75° to 200° C., a pressure of about 1 to 100 bars and for a time period of about 0.5 to 24 hours, a mixture of copper phthalocyanine blue, about 2 to 2000 parts sulfuryl chloride, about 0.05 to 50 parts sulfur monochloride, about 0.025 to 25 parts aluminum chloride and about 0.025 to 25 parts cuprous chloride, all by weight per part of copper phthalocyanine blue whereby a green copper phthalocyanine compound is obtained.

2. The process of claim 1 wherein the proportions of the components of said mixture in parts by weight per part of copper phthalocyanine blue is from about 2 to 100 sulfuryl chloride, about 0.1 to 5.0 sulfur monochloride, about 0.1 to 5.0 aluminum chloride, and from about 0.1 to 5.0 parts cuprous chloride.

3. The process of claim 2 wherein after the reaction the sulfuryl chloride is removed by evaporation, the residue is slurried in by weight from about 10 to 100 parts of water and about 1 to 20 parts by weight sodium bicarbonate per part of copper phthalocyanine, $CO_2$ is permitted to be removed by evolution, the slurry acidified with sulfuric acid, filtered, washed and dried.

* * * * *